W. and T. Schnebly,
Mower.
No. 24,496. Patented June 21, 1859.
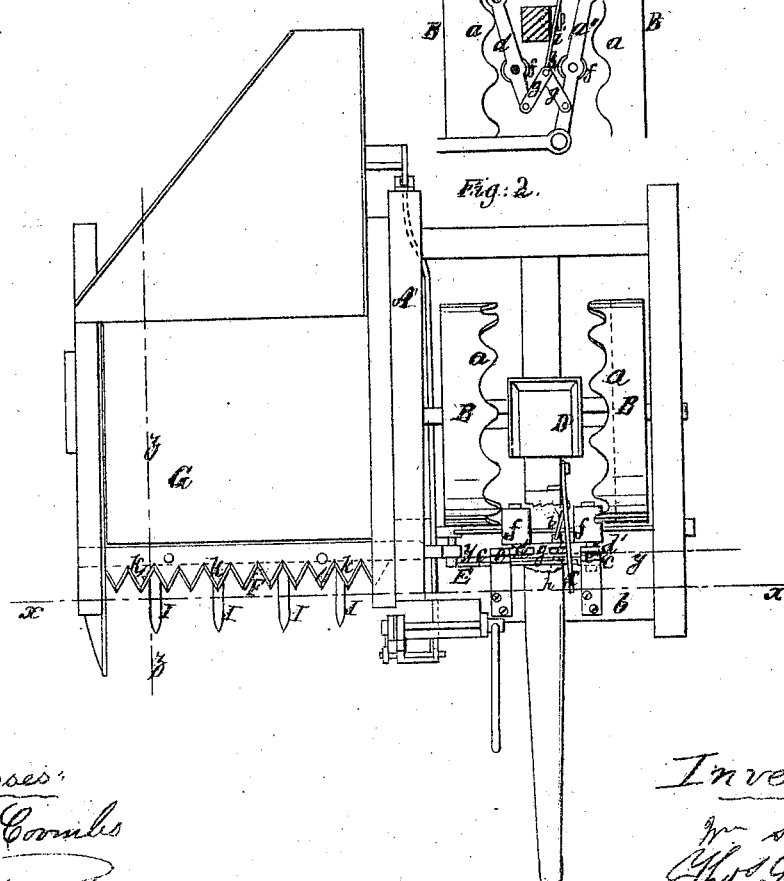

UNITED STATES PATENT OFFICE.

WILLIAM SCHNEBLY AND THOMAS SCHNEBLY, OF HACKENSACK, N. J.

IMPROVEMENT IN HARVESTING-MACHINES.

Specification forming part of Letters Patent No. 24,496, dated June 21, 1859.

*To all whom it may concern:*

Be it known that we, WILLIAM SCHNEBLY and THOMAS SCHNEBLY, both of Hackensack, in the county of Bergen and State of New Jersey, have invented certain new and useful Improvements in Grain and Grass Harvesters; and we do hereby declare that the following is a full, clear, and exact description of the same, reference being had to the annexed drawings, making a part of this specification, in which—

Figure 1 is a front sectional view of our invention, taken in the line $x\,x$, Fig. 2; Fig. 2, a plan or top view of the same; Fig. 3, a detached view of the device for operating the sickle, the framing of the machine being bisected, as indicated by $y\,y$, Fig. 2. Fig. 4 is a transverse section of the cutting device, taken in the line $z\,z$, Fig. 2.

Similar letters of reference indicate corresponding parts in the several figures.

To enable those skilled in the art to fully understand and construct our invention, we will proceed to describe it.

A represents the main frame of the machine, which is mounted on two wheels, B B, which have scalloped rims $a\,a$, said rims projecting beyond the inner sides of the wheels, so that the scalloped edges will face each other, as shown clearly in all the figures.

To the front cross-bar, $b$, of the main frame A two metal uprights, $c\,c$, are attached, and to these uprights pendulous levers $d\,d'$ are attached, one to each. The fulcrum-pins $e$ of these levers, which pins connect the levers to the uprights, are just at the inner sides of the planes of rotation of the scalloped rims $a\,a$.

To each lever $d\,d'$ a friction-roller, $f$, is attached, against which rollers the scalloped edges of the rims $a\,a$ act. The levers $d\,d'$, below the rollers $f\,f$, are connected by toggles $g\,g$, to the fulcrum-pin $h$ of which a rod, $i$, is attached, the upper end of said rod being connected to a lever, C, which is within the reach of the driver on seat D. The lever $d'$ projects down farther than the lever $d$, and has a connecting-rod, E, attached to its lower end, said rod E being connected to the cutter-bar $j$ of the sickle F. The sickle F is attached to a platform, G, which is connected to the main frame A in any proper manner, so that it may yield and conform to the inequalities of the surface of the ground. The sickle is formed of V-shaped teeth $k$, attached to the upper surface of the cutter-bar $j$, the front and back edges of which are inclined, so that the bar may fit in dovetail grooves $l$, made in the upper surfaces of the fingers I, as shown clearly in Fig. 3. The teeth $k$ of the sickle F rest or bear on the upper surfaces of the fingers I, which fingers are attached to a proper bar, $m$, at the front end of the platform G. By this mode of attaching the cutter-bar $j$ to the fingers I the teeth $k$ are kept in close contact with the upper surfaces of the fingers I without the aid of a cap or top bearings on the upper surface of the sickle, and consequently no obstruction is offered to the passage of the cut grass or grain over the sickle. The friction which also attends the employment of the top bearings or cap on the sickle is avoided. As the machine moves along the levers $d\,d'$ are vibrated by the action of the scalloped edges of the rims $a\,a$ against the rollers $f$, the rollers $f$ being acted upon alternately in consequence of the prominences of one scalloped rim being opposite the hollow portions of the other, as shown clearly in all the drawings. The movement of one lever is communicated to the other by means of the toggles $g\,g$, when said toggles are adjusted in line with each other. By this arrangement the sickle F is operated from the driving-wheels B with but little friction, as the power is applied in a very direct manner.

By the use of the toggles $g\,g$ the driver may at any time throw the rollers $f\,f$ beyond the reach or planes of rotation of the scalloped edges of the rims $a\,a$ by simply raising the fulcrum $h$, as shown in Fig. 3.

By the employment or use of two levers, $d\,d'$, having separate or independent fulcra $e\,e$, and operated by two scalloped rims, $a\,a$, a perfect freedom of movement is obtained in the operation of the levers. In cases where a single lever has been operated by a zigzag groove much power is lost in consequence of the aptitude of the roller to bind in the groove, and no facile means has, so far as we are aware, been devised for the throwing of a single lever out of gear with the driving-wheel. By our invention this difficulty is obviated, as the simple adjustment of the toggles $g\,g$, as described, effects the result.

We are aware that scalloped wheels and zigzag grooves have been formed or attached to the driving-wheels of harvesters for the purpose of actuating or vibrating levers to drive reciprocating sickles. We therefore do not claim broadly such device; but We do claim as new and desire to secure by Letters Patent—

The employment, in combination with the pendulous levers $d\ d'$, of the toggle-levers $g\ g$, substantially as herein shown and described, whereby the said levers $d\ d'$ may, without shifting their axes of motion $f\ f$, be thrown in or out of connection with the drivers B B.

WM. SCHNEBLY.
THO. SCHNEBLY.

Witnesses:
J. W. COOMBS,
MICH. HUGHES.